Aug. 7, 1928.

O. J. HERB

COUPLING MEMBER

Filed April 25, 1924

1,679,863

Inventor:
Otto J. Herb.
By Earl Pierce
Atty.

Patented Aug. 7, 1928.

1,679,863

UNITED STATES PATENT OFFICE.

OTTO J. HERB, OF CHICAGO, ILLINOIS, ASSIGNOR TO THE BASSICK MANUFACTURING COMPANY, OF CHICAGO, ILLINOIS, A CORPORATION OF DELAWARE.

COUPLING MEMBER.

Application filed April 25, 1924. Serial No. 708,928.

My invention relates to improvements in coupling members, and is particularly concerned with improvements in coupling members adapted to form a part of a lubricating system comprising a plurality of fittings to be secured to the bearings to be lubricated, and a lubricant compressor embodying means for placing lubricant under pressure, and a coupling member for successively making sealed connection with the various fittings, so that the lubricant, under high pressure, can be forced into the fittings without leakage.

One of the objects of my present invention is to provide a coupling member particularly adapted to form a part of a lubricating system such as that described and claimed in United States patent to Piquerez, Reissue No. 15,503, of December 5, 1922.

Another object of my invention is to provide a coupling member of the character described, in which means is provided for yieldingly holding the central portion of the sealing member, or gasket, in an outwardly bowed, or convexed position, so as to insure a tight initial contact between the sealing member and the fitting.

A further object of my invention is to provide a coupling member of the character described in which the sealing member is so arranged and secured that it will not become distorted during the act of securing the coupling member to a fitting, and Finally, to provide a coupling member of the character described, which is simple in construction, economical to manufacture, and easy to operate.

Figure 1:
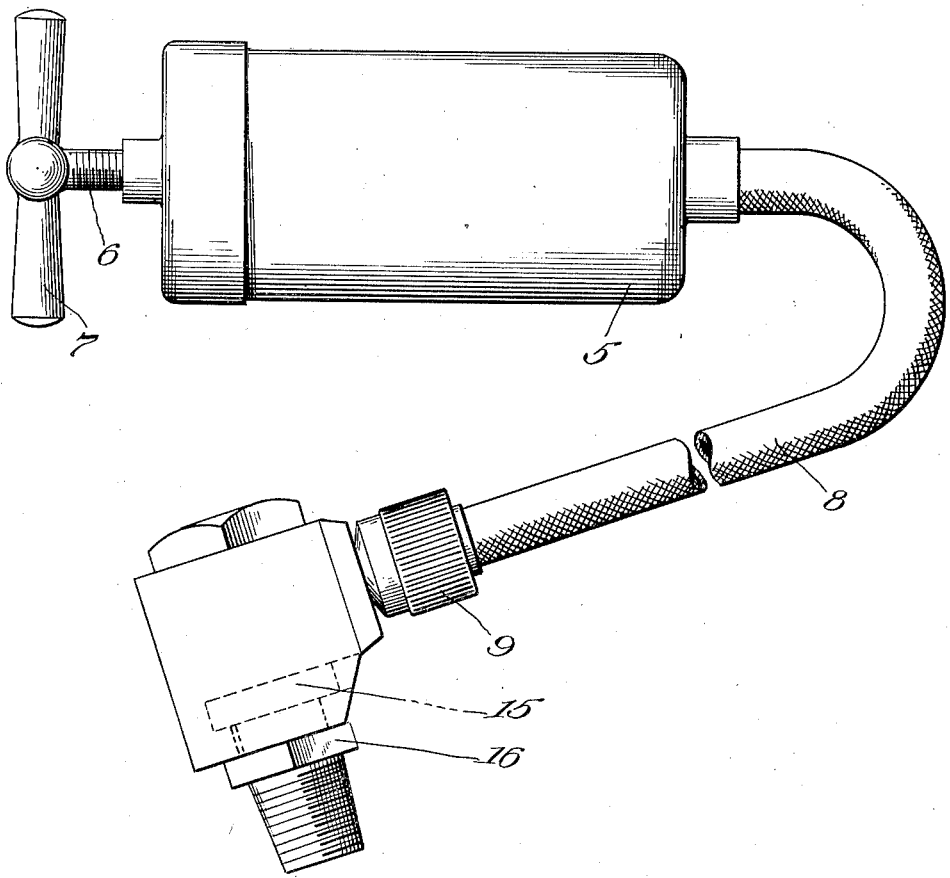
Figure 2:
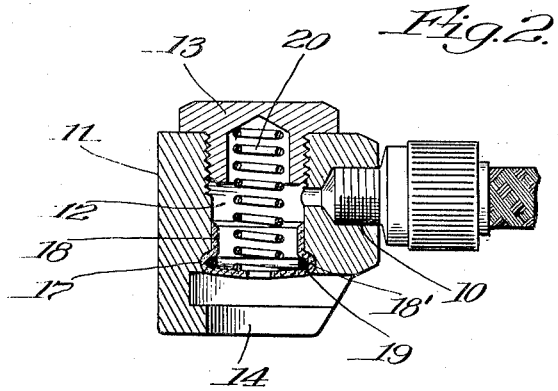

Other objects of my invention will appear as this description progresses, reference being had to the accompanying drawings, in which Figure 1 is a side elevation of a lubricant compressor embodying my improved coupling, which is here shown attached to one of the fittings forming a part of the lubricating system, and Figure 2 is a central longitudinal section through my improved coupling member.

Referring to the drawings, I have illustrated my improved coupling in connection with a lubricant compressor comprising a barrel 5 having a piston (not shown) reciprocable therein, this piston being carried by the inner end of the screw threaded piston rod 6, which is provided at its outer end with the handle 7.

A flexible discharge conduit 8 is connected with the opposite end of the barrel 5 and terminates in the union 9. This union is threaded into the bore 10 formed in the body member 11 of my improved coupling member. The bore 10 communicates with the bore 12, which extends transversely through the body member 11, one end of the bore being closed by the cap 13 which is threaded into the bore, as shown in Figure 2.

A pair of oppositely disposed flanges 14, only one of which is shown in Figure 2, are formed integrally with the body member 11 for engaging beneath the head 15 of a fitting 16, such as shown in Figure 1, for mechanically securing the coupling member to the fitting.

A toroidal groove 17 is formed in the wall of the bore 12 adjacent the flanges 14, and a cup leather 18 is positioned in the same end of this bore. For securing the cup leather in the position shown, I provide a split ring 19 which is inserted in the cup leather and permitted to expand so as to force an annular portion 18' of the cup leather 18 into the groove 17, as shown in Figure 2.

In order to convex the bottom of the cup leather 18 outwardly so as to insure a good initial contact between the cup leather and the head 15 of the fitting, I provide the compression spring 20 which is confined between the bottom of the cup leather 18 and the plug 13, and which tends to force the bottom of the cup leather out to the position shown in Figure 2. When the cup leather is conformed, as shown in this figure, it not only insures a good initial contact between the bottom of the cup leather and the head of the fitting, but it makes it unnecessary to have the edge of the cup leather project beyond the adjacent end or face of the body member 11 and, therefore, prevents the heads of the fittings from engaging the edge of the cup leather during the operations of connecting the coupling member with the fittings, and thus prevents the cup leather from being deformed.

My improved coupling is simple in construction and economical to manufacture.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A coupling member for a lubricant compressor comprising a body member having a bore therethrough, a toroidal groove formed in the wall of said bore adjacent one end thereof, a cup leather in the last mentioned end of said bore, a split ring pressing the flange of said cup leather into said groove, a plug closing the other end of said bore, and a compression spring confined between said plug and the bottom of said cup leather.

2. A coupling member for a lubricant compressor comprising a body member having a bore therethrough, a groove formed in the wall of said bore adjacent one end thereof, a cup leather in the last mentioned end of said bore, a ring pressing the flange of said cup leather into said groove, a plug closing the other end of said bore, and a compression spring confined between said plug and the bottom of said cup leather.

3. A coupling member comprising a body member having a bore opening through one side thereof, the wall of said bore having a groove formed therein adjacent the open end of said bore, a cup leather in the open end of said bore, a ring pressing the flange of said cup leather into said groove, and a spring pressing the bottom of said cup leather outwardly.

In witness whereof, I hereunto subscribe my name this 18th day of April, 1924.

OTTO J. HERB.